United States Patent [19]
Fowler et al.

[11] Patent Number: 4,504,833
[45] Date of Patent: Mar. 12, 1985

[54] SYNTHETIC PULSE RADAR SYSTEM AND METHOD

[75] Inventors: James C. Fowler, Burke; Howard S. Wheatley, Alexandria; John L. Davis, Fairfax, all of Va.

[73] Assignee: Xadar Corporation, Springfield, Va.

[21] Appl. No.: 329,042

[22] Filed: Dec. 9, 1981

[51] Int. Cl.³ ............................. G01S 7/28; G01S 7/32
[52] U.S. Cl. ............................. 343/5 NA; 343/5 FT; 343/17.1 R; 367/14; 367/37; 324/337
[58] Field of Search ............. 343/5 FT, 5 NA, 5 SA, 343/5 NQ; 367/14, 37; 324/337

[56] References Cited

U.S. PATENT DOCUMENTS

| | | | |
|---|---|---|---|
| 3,263,227 | 7/1966 | Ferry et al. | 343/17.1 R |
| 3,806,795 | 4/1974 | Morey | 324/6 |
| 4,008,469 | 2/1977 | Chapman | 343/5 NA |
| 4,041,489 | 8/1977 | Lewis | 343/17.1 R |
| 4,072,942 | 2/1978 | Alongi | 343/5 NA |
| 4,095,224 | 6/1978 | Dounce et al. | 343/17.1 R |
| 4,218,678 | 8/1980 | Fowler et al. | 343/5 FT |

OTHER PUBLICATIONS

"Location and Recognition of Discontinuities in Dielectric Media Using Synthetic RF Pulses", L. A. Robinson, Proceedings of the IEEE, vol. 62, No. 1, Jan. 1974, pp. 36–44.

"An RF Time Domain Reflectometer Not in Real Time", L. A. Robinson, IEEE Transactions on Microwave Theory and Technology, vol. MTT-20, pp. 855–857.

Primary Examiner—Maynard R. Wilbur
Assistant Examiner—Gilberto Barrón, Jr.
Attorney, Agent, or Firm—Sixbey, Friedman & Leedom

[57] ABSTRACT

The invention includes a method and apparatus for detecting geophysical phenomena by the use of a synthetic pulse radar. A radar transmitter generates a plurality of component signals of different frequencies which approximate at least a portion of the Fourier transform of a radar short pulse. These component signals are transmitted simultaneously for modulation by the geophysical phenomena, and the modulated component signals are substantially simultaneously received in a receiver. The receiver divides the component signals, and as to each determines representative parameters. The invention also includes a heterodyne receiver which operates with a fixed IF frequency and incorporates a single frequency quadrature system.

18 Claims, 8 Drawing Figures

SYNTHETIC PULSE RADAR SYSTEM AND METHOD

TECHNICAL FIELD

This invention relates to pulse radar detection of targets in extended media, including natural phenomena such as oil, coal and ore deposits within the earth. In particular, this invention relates to a pulse radar system employing a synthetic pulse formed from a spectrum of frequencies generated and detected by digitally controlled transmitter and receiver circuits.

BACKGROUND ART

The advantages of using impulse or short pulse radar for detecting discontinuities in dielectric media is well recognized as disclosed in U.S. Pat. No. 4,072,942 to Alongi, U.S. Pat. No. 4,008,469 to Chapman and U.S. Pat. No. 3,806,795 to Morey. Systems of the type disclosed in these patents operate by radiating a pulse of only one or a few excursions containing a broad spectrum of radio frequencies enabling the system to detect target phenomena of widely varying characteristics. When radiated into a dielectric medium, short pulses are reflected by discontinuities in the medium in a manner which allows the pulse echo to be detected and analyzed to provide information about the location and size of the discontinuity. Generation of a short pulse in real time, however, involves two serious drawbacks. The first is rne necessity of recording the high-frequency data with a reasonable dynamic range, while the second is the problem of designing an antenna capable of coupling the broad band energy efficiently into the ground. The first problem can be solved in part by using a heterodyne receiver technique. The problem of efficient antenna coupling is much more difficult. Normally, attempts to solve this problem have involved building a broad band antenna designed to have a minimum of reflections. While such an antenna operates well to transmit energy into the medium, it is by necessity a low-gain antenna system.

One prior attempt to overcome the drawbacks of real time pulse radar has been the development of a synthetic pulse radar in which continuous wave measurements are made at many selected frequencies defining a Fourier spectrum of frequencies equivalent to the bandwidth of a short radio frequency pulse. This prior art system is disclosed in Robinson, L.A. et al, "Location and Recognition of Discontinuities in Dielectric Media Using Synthetic RF Pulses," Proceedings of the IEEE, Vol. 62, No. 1, January, 1974, pages 36–44, and in Robinson, L.A. et al, "An RF Time Domain Reflectometer Not in Real Time", IEEE Transactions on Microwave Theory and Tech., Vol. MTT-20, pages 855–857. In the system disclosed in these articles, a computer is used to control the sequence of measurements, to store the measured parameters and to process the stored parameters to permit a synthetic pulse echo to be displayed. Since the amplitudes and phases of the spectral lines can be individually controlled, the synthetic radar pulse may be shaped to achieve optimum tradeoff between short pulse width, small ringing on the baseline between pulses, and total bandwidth covered by the spectrum.

The Robinson et al system included a tunable oscillator requiring external frequency-stabilizing circuitry to obtain the necessary degree of stability in the frequency output of the oscillator. Such stabilizing circuitry adds to the expense and complexity of the synthetic pulse system, and a tunable oscillator is not compatible with standard digital logic circuitry, such as a microprocessor control circuit. Consequently, a digitally controlled, synthetic pulse radar apparatus was developed which was more compatible with integrated circuit control components. This apparatus, disclosed in U.S. Pat. No. 4,218,678 to Fowler et al includes a master oscillator for generating a base periodic signal which is provided to a synthesizer in a transmitter. The synthesizer generates a Fourier spectrum of frequencies for a desired synthetic radar pulse by successively multiplying the base periodic signal by each integer in a series of integers represented by digital signals received from a microprocessor based controller. The transmitter also includes an attenuator control for controlling the strength of the periodic component signals making up the Fourier spectrum in response to an attenuator control signal from the microprocessor based controller. The output from the attenuator control is suitably amplified and transmitted by a transmitter antenna.

The Fowler et al system includes a receiver designed to recover representative parameters of each of the periodic component signals which have been broadcast by the transmitter and modulated by the geophysical phenomena being measured. The receiver includes a frequency synthesizer similar to that used in the transmitter which multiplies the base periodic signal from the oscillator by each integer received from the microprocessor based controller. The recevier also includes a quadrature circuit which receives the signals from the frequency synthesizer and produces both in-phase and quadrature reference signals having a known fixed frequency to the broadcast periodic component signals. The quadrature and in-phase reference signals have a 90° phase difference relative to each other. Both the in-phase reference signals and the quadrature reference signals are then mixed with the electrical signal representative of the portion of the periodic component signal returned from the geophysical phenomena to yield both phase and amplitude information.

The synthetic pulse radar system disclosed by the Fowler et al patent eliminates many of the impractical complexities of prior art systems and is a distinct improvement over such systems. However, even this improved system provides for the transmission of only a single frequency at a time, and the single transmitted frequency must be accurately reproduced in the receiver. This limits to some extent the sensitivity of the system. Furthermore, the transmission of only a single frequency during a geophysical survey results in a relatively slow data acquisition rate which increases the time required for the survey.

SUMMARY OF THE INVENTION

It is a primary object of the present invention to provide a novel and improved digitally controlled, synthetic pulse radar apparatus and method which overcome the deficiencies of the prior art as noted above.

Another object of the present invention is to provide a novel and improved synthetic pulse radar apparatus employing a heterodyne receiver which provides increased sensitivity by eliminating the necessity to accurately maintain the system transmit frequency with a fixed IF frequency which permits the use of a conventional 90° quadrature hybrid in the receiver system.

A still further object of the present invention is to provide a novel and improved synthetic pulse radar system including a transmitter which is adapted to transmit simultaneously a plurality of desired frequencies, and a receiver system including a plurality of individual receivers to receive said transmitted frequencies which are returned from a geophysical phenomena being measured and to derive phase and amplitude information therefrom.

Another object of the present invention is to provide a novel and improved synthetic pulse radar system which is capable of reducing the time required to achieve multi-octave frequency sweeps by simultaneously generating harmonically related sweeps. This is accomplished by employing synthesizers in both the system transmitter and receiver which are tuned to the beginning frequency of one of the desired frequency octaves. As the synthesizers are tuned throughout the octave, harmonic generators connected thereto are simultaneously producing the appropriate harmonics, thus enabling the receiver to determine the phase and amplitude of all harmonically related signals Yet a further object of the present invention is to provide a novel and improved synthetic pulse radar system adapted to achieve simultaneous frequency transmission which includes a plurality of single frequency synthesizers in both the transmitter and receiver sections of the system. Each synthesizer generates a spectrum of frequencies from a base periodic signal, and by a judicious selection of the simultaneously transmitted frequencies, a considerable reduction in the undesirable effects of harmonic and intermodulation distortion can be realized.

Still another object of the subject invention is to provide a synthetic pulse radar system including a receiver circuit for determining both amplitude and phase differences between the individual broadcast frequency signals (periodic component signals) and the electrical signals generated by the receiver circuit, which electrical signals are representative of the recovered portions of the periodic component signals returned from the geophysical phenomena being measured. The receiver circuit includes a single frequency quadrature circuit for producing in-phase reference signals which have a known fixed frequency and phase relationship to a base periodic signal provided to both the transmitter and receiver circuits by a master oscillator. The quadrature circuit also produces quadrature reference signals which have the same frequency and a 90° phase difference relative to each other. Both the in-phase reference signals and the quadrature reference signals are mixed with the electrical signal representative of the result of mixing the periodic component signal returned from the geophysical phenomena to yield both phase and amplitude information.

A further object of this invention is to provide a method for detecting geophysical phenomena including the steps of generating a base periodic signal having a predetermined base frequency, generating a succession of digital signals representative of a series of integers which, when multiplied times the base frequency, yields a plurality of frequencies representing either a complete Fourier spectrum of a desired radar pulse or portion of such Fourier spectrum.

A still further object of the present invention is to provide a method for detecting geophysical phenomena which includes the steps of simultaneously generating and transmitting a plurality of multifrequency synthetic pulses and receiving such pulses in multiple receivers where the pulses are subsequently processed.

Still other and more specific objects of the subject invention may be appreciated by consideration of the following Brief Description of the Drawings and the following Description of the Best Mode for Carrying Out the Invention.

BEST MODE FOR CARRING OUT THE INVENTION

Figure 1:
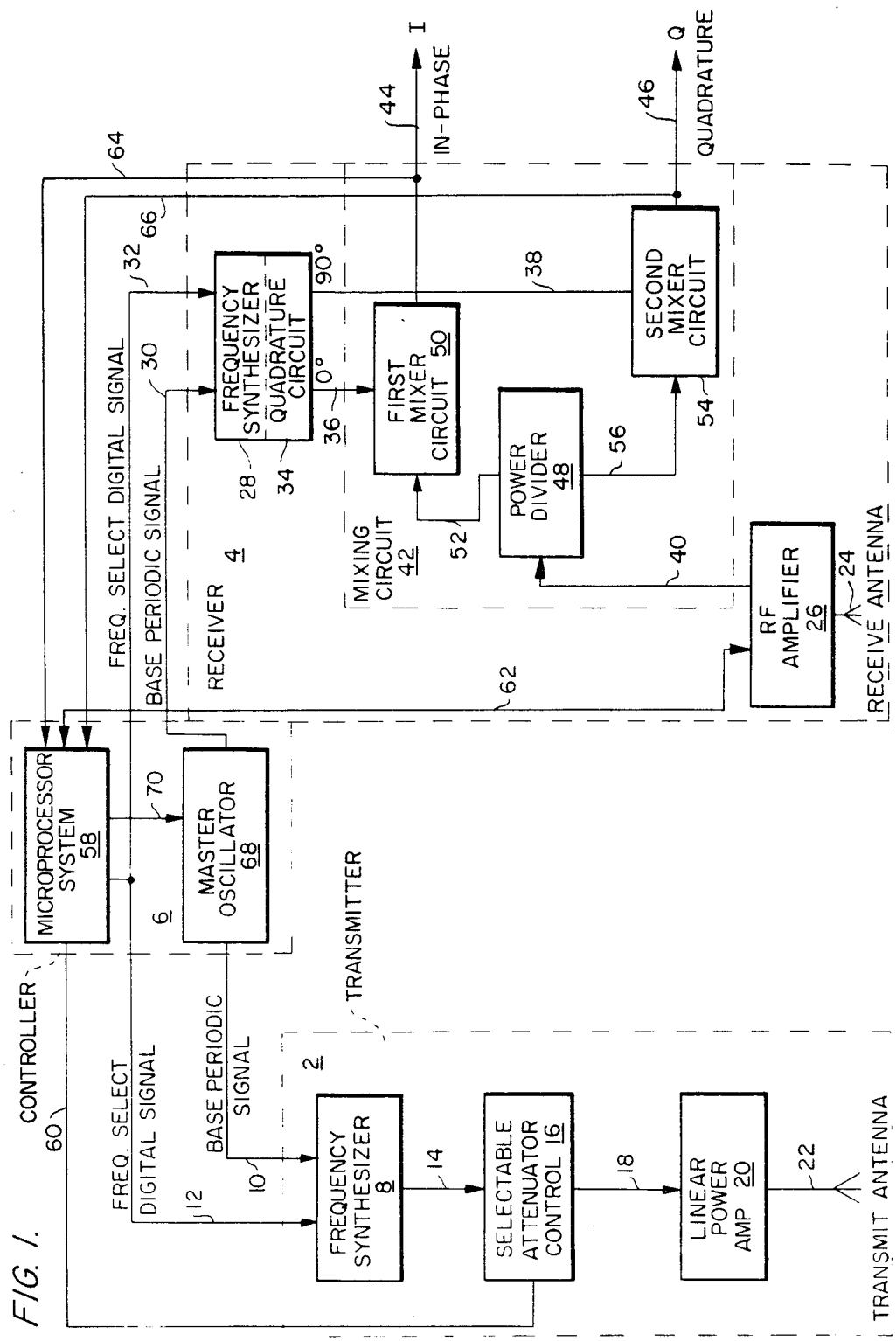
FIG. 1 is a block diagram of a prior art synthetic pulse radar system.

The synthetic pulse radar system of the present invention incorporates many of the systems described in detail in the Fowler et al U.S. Pat. No. 4,218,678, and the disclosure of this patent is incorporated herein by reference. The basic schematic of this prior art system is disclosed in FIG. 1, wherein it will be noted that the system is primarily composed of a transmitter 2, a receiver 4 and a microprocessor based controller 6. An important feature of the disclosed system is its compatibility with standard integrated digital logic circuitry which eliminates the need for specialized frequency stabilization circuitry and/or command signal buffers for interfacing the microprocessor based controller with the circuitry forming the transmitter 2 and receiver 4.

The transmitter 2 is designed to produce a Fourier spectrum of frequencies equivalent to a desired synthetic radar pulse. This synthetic pulse is formed by generating during each of a plurality of successive time intervals one of a corresponding plurality of periodic component signals, each of which has a uniquely discrete frequency which is an integral multiple of a predetermined base frequency. Transmitter 2 includes a frequency synthesizer 8 for receiving a base periodic signal on line 10 and a digital signal on line 12, which signals are multiplied to produce a first base reference signal. The output of synthesizer 8 is transmitted over line 14 to an attenuator control circuit 16 designed to control the strength of the periodic component signals broadcast by the transmitter 2 by controlling the attenuation of the first base reference signals produced by the frequency synthesizer 8. The output from attenuator control 16 is transmitted over line 18 to a linear power amplifier 20 designed to supply the periodic component signals of the synthetic radar pulse to antenna 22. The organization and the specific function of the various components making up transmitter 2 are described in detail in U.S. Pat. No. 4,218,678.

Receiver 4 is designed to recover representative parameters of each of the periodic component signals which have been broadcast by transmitter 2 and modulated by the geophysical phenomena being measured. Such phenomena may include coal mine hazards, subsurface geological features such as the interfaces between geological strata, the material of the strata, the presence of boulders, rock or aggregate, the depth through overburden to bedrock, the presence and extent of cavities or voids in limestone or other materials and the depth to water table. Other phenomena which may be detected by apparatus of this type include buried artifacts including metallic or nonmetallic utility pipes, conduits, and lines such as might be used for water, gas and sewage and other buried metallic and non-metallic objects.

Receiver 4 includes a receiver antenna 24 for picking up the returned portion of a broadcast periodic component signal and for providing a signal to a radio frequency amplifier 26. Amplifier 26 amplifies the antenna signal to provide an electrical signal representative of a portion of the energy of each broadcast periodic component signal which has been modulated by the geophysical phenomena being tested.

Receiver 4 further includes a frequency synthesizer 28 similar to the frequency synthesizer 8 of the transmitter 2 in that the synthesizer 28 performs the function of multiplying the base periodic signal received on line 30 times the digital signals received on line 32 in order to produce a first base reference signal having the same frequency and phase as the periodic component signal being broadcast at any given time by transmitter 2. The digital signals received on lines 12 and 32 by synthesizers 8 and 28, respectively, can therefore be considered as frequency selecting signals.

Frequency synthesizer 28 differs from synthesizer 8 by the addition of a quadrature circuit 34 designed to convert the first base reference signal into an in-phase reference signal supplied to line 36 and a quadrature reference signal supplied to line 38. The in-phase reference signal must have the same frequency and phase as the periodic component signal being broadcast at any given time by transmitter 2, while the quadrature reference signal must have the same frequency but a 90° phase shift relative to the periodic component signal being broadcast at any given time by transmitter 2. The exact manner by which the in-phase and quadrature reference signals are formed by quadrature circuit 34 is again discussed in detail in U.S. Pat. No. 4,218,678.

The reference signals supplied to lines 36 and 38 and the output electrical signal from RF amplifier 26 supplied to line 40 form the inputs to a mixing circuit 42. The function of circuit 42 is to produce a parameter signal on output lines 44 and 46 representing the recovered parameters for each corresponding periodic component signal broadcast by transmitter 2. In particular, mixing circuit 42 is designed to mix the electrical signal supplied on line 40 (which represents a portion of the energy of each periodic component signal modulated by a geophysical phenomena) with the reference signals supplied on lines 36 and 38, respectively, to form the parameter signal having an in-phase component provided on line 44 and a quadrature component provided on line 46. Mixing circuit 42 includes a power divider circuit 48 for supplying the electrical signal supplied from line 40 to a first mixer circuit 50 over line 52 and a second mixer circuit 54 over line 56. Power divider 48 is characterized by a zero phase shift in the signals supplied to lines 52 and 56 relative to the input electrical signal received on line 40 from amplifier 26.

Synchronous operation of both the transmitter 2 and receiver 4 is accomplished by means of the microprocessor based controller 6 designed to provide the frequency selecting digital signals to lines 12 and 32 in accordance with a preprogrammed spectrum of frequencies. The spectrum of frequencies may be selectively modified by the system user as desired to provide the best possible synthetic radar pulse for a given set of operating conditions. Controller 6 is also designed to receive the in-phase and quadrature component signals from lines 44 and 46. These signals are converted to digital format and stored by the microprocessor 58 which can then compute the inverse transform of such signals to produce information about a geophysical phenomena in the manner discussed in U.S. Pat. No. 4,218,678. The microprocessor system 58 is further designed to supply attenuator control signals to line 60 and amplifier gain control signals to amplifier 26 over line 62 in accordance with the strength of the inphase and quadrature component signals received over lines 64 and 66 connected with lines 44 and 46, respectively. Controller 6 includes a master oscillator 68 for generating and supplying the base periodic signal to lines 10 and 30 to thereby synchronize operation of both the transmitter and receiver. Operation of the microprocessor system 58 and master oscillator circuit 68 may also be synchronized by providing the microprocessor clock signal to the master oscillator 68 over line 70.

Figure 2:
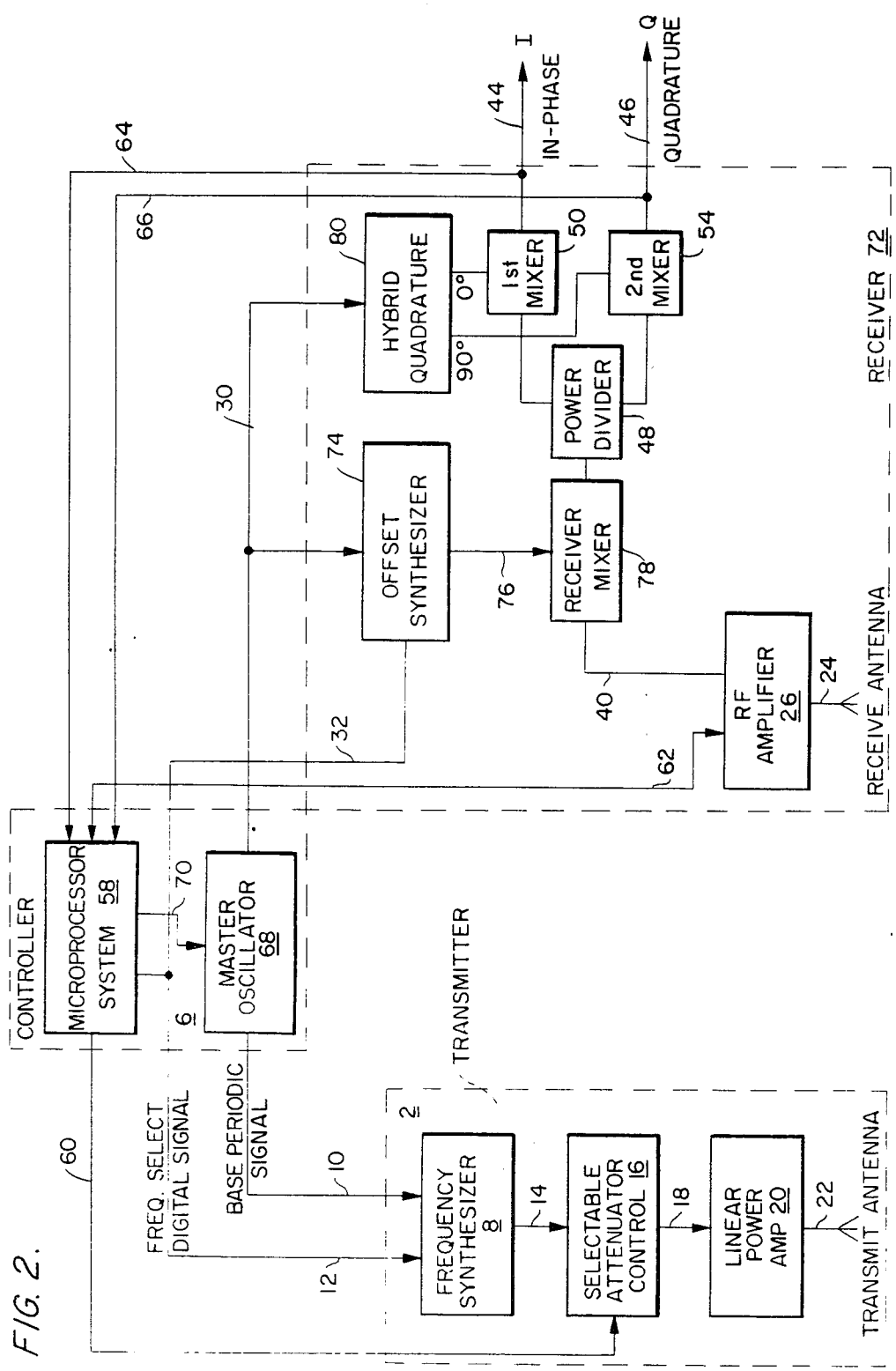
FIG. 2 is a detailed block diagram of a heterodyne receiver incorporated in the system of FIG. 1 to provide a synthetic pulse radar system in accordance with the present invention.

Referring now to FIG. 2, it will be noted that the synthetic pulse radar system of FIG. 1 has been modified in accordance with the present invention to operate with a heterodyne receiver 72. For this system, the transmitter 2 and controller 6 remain the same as those employed in the system of FIG. 1, but the receiver 4 is replaced by a receiver 72 which is offset from the transmitter 2. The heterodyne receiver 72 includes many components which are the same as those present in the receiver 4 and which operate in an identical manner, and these components will be designated by the same reference numerals used in FIG. 1.

In the receiver 72, unlike the receiver 4, only an offset frequency synthesizer 74 receives the digital signal supplied over line 32 from the controller 6, and this causes the synthesizer to produce a reference output on the output line 76 by multiplying the base periodic signal received from the master oscillator 68 over line 30 times the energy represented by the successive digital signals received on line 32. In this manner, the offset synthesizer 74 operates in a manner similar to that of the synthesizer 28 of FIG. 1, but unlike the synthesizer 28, the offset synthesizer is not connected to a quadrature circuit. Instead, the output from the synthesizer 74 is fed over the output line 76 to a receiver mixer 78. Here, the synthesizer output is mixed with the output from the RF amplifier 26 to provide a mixer output signal which is an IF signal that is phase coherent with the signal on line 30. The resultant mixer output signal is provided to the power divider 48.

In the receiver 72, the relatively complex quadrature circuit 34 of FIG. 1 is replaced by a simple, fixed frequency 90° quadrature hybrid of conventional type which will receive a single fixed IF frequency signal and output an in-phase output signal as well as a quadrature output signal shifted 90° in-phase relative to the in-phase output signal. This fixed frequency quadrature hybrid receives the fixed base periodic signal over the line 30 from the master oscillator 68, and from this signal produces the in-phase and quadrature output signals on the lines 36 and 38 respectively. The use of the quadrature hydrid 80 is made possible by the fact that it is no longer necessary to duplicate the transmit frequency in the I and Q channels connected to the outputs of the quadrature circuit, and these channels are now maintained at a fixed frequency, independent of the transmit or receive frequency.

The outputs from the power divider 48 on the lines 52 and 56 are mixed with the in-phase and quadrature output signals on the lines 36 and 38 in the mixers 50 and 54 in the same manner as in the receiver circuit 4 of FIG. 1. The heterodyne receiver 72 differs primarily from the receiver 4 in the use of the offset synthesizer 74 and receiver mixer 78, this receiver mixer being similar in construction and operation to the mixers 50 and 54. These changes provide considerably increased sensitivity over that. previously experienced with the receiver 4, since the transmit frequency is not required in the receiver. All that the heterodyne receiver requires is a phase coherent IF frequency from the master oscillator 68, such as a 1 MHz frequency.

The synthetic pulse radar systems of FIGS. 1 and 2 transmit only a single frequency at a time. However, a modified version of these devices may be used to implement the synthetic pulse concept while transmitting more than one frequency simultaneously. The ability to transmit multiple frequencies simultaneously will have applicability in situations where a long integration time is being used, or for exploration where the receiver and/or transmitter are in motion. Obviously the transmission of multiple frequencies simultaneously increases the data acquisition rate significantly over that possible with a single frequency system.

Figure 3:
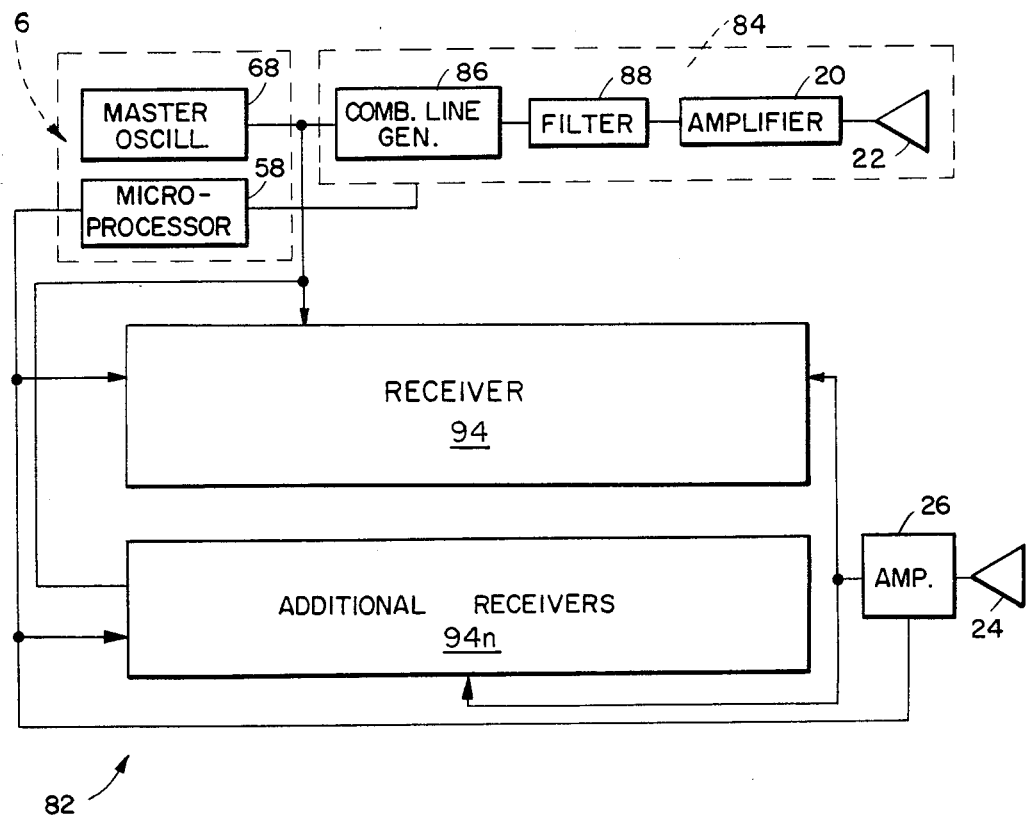
FIG. 3 is a block diagram of a second embodiment of the synthetic pulse radar system of the present invention which is adapted to provide the simultaneous transmission of multiple frequency pulses.
Figure 4:
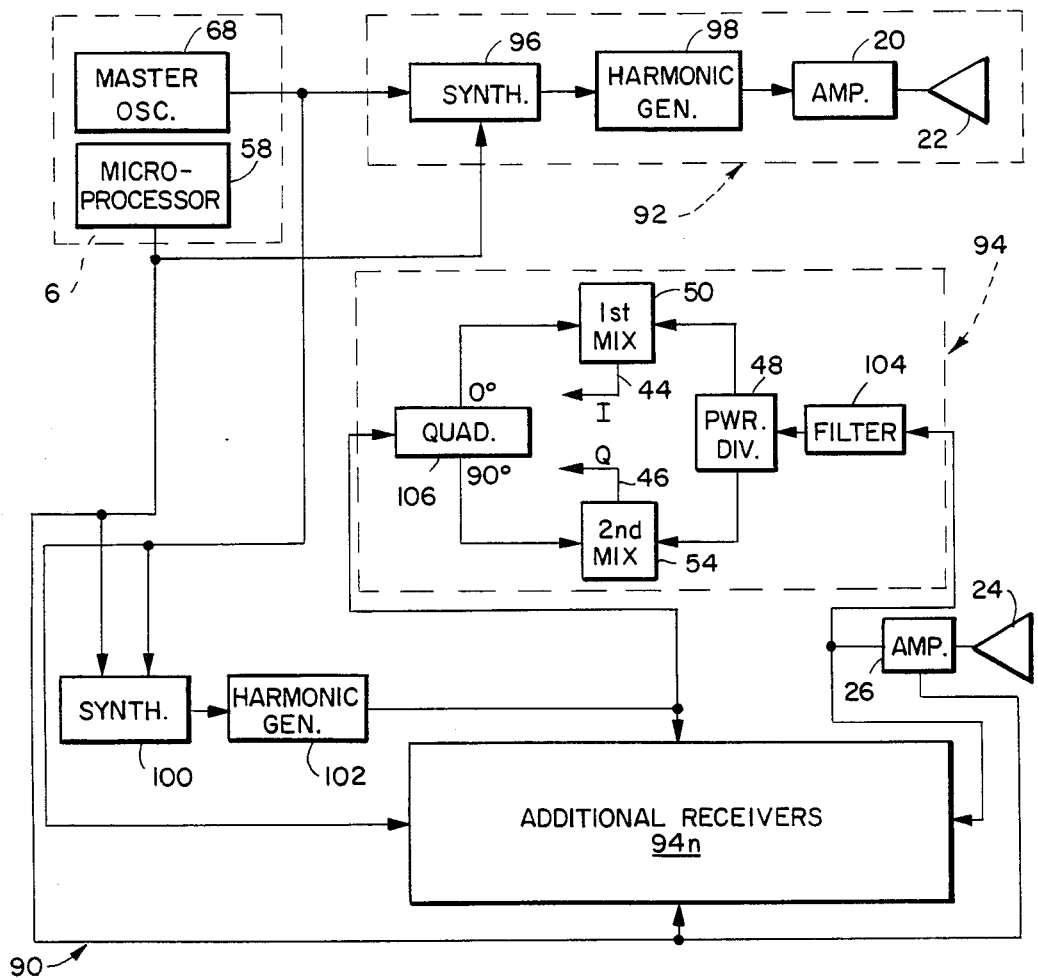
FIG. 4 is a block diagram of a third embodiment of the synthetic pulse radar system of the present invention which is adapted to provide multi-octave frequency sweeps by simultaneously generating harmonically related sweeps.

FIG. 3 discloses a synthetic pulse radar system 82 adapted to implement a multiple frequency technique wherein all desired frequencies are simultaneously transmitted. This system employs the controller 6 of FIG. 1 and a plurality of receivers, each of which may constitute either the receiver 4 of FIG. 1 or the receiver 72 of FIG. 2, but preferably receivers 94 such as those shown in FIG. 4 are employed. These receivers will be described in detail in connection with the description of the system of FIG. 4.

In the multiple frequency synthetic pulse radar system 82, the transmitter 4 of FIGS. 1 and 2 is replaced by a transmitter 84, which includes a comb line generator 86 that is excited either sinusoidally or by a square wave from the master oscillator 68. This excitation of the comb line generator causes the generator to output a broad frequency spectrum to a transmitter filter 88 set to pass selected frequencies which are increments of a base frequency. For example, if the master oscillator provides a reference frequency of 1 MHz to the comb line generator, then the filter 88 might be set to select frequencies between 20 and 40 MHz for amplification and transmission. Consequently, these twenty selected transmit frequencies would be simultaneously passed through the filter 88 and amplified by the amplifier 20 for transmission. These twenty transmitted frequencies would be simultaneously received by the receiving antenna 24, amplified in the amplifier 26 and selectively provided to twenty separate receivers 94-94n. These twenty receivers would be tuned to receive one of the transmitted frequencies, and consequently, each of the receivers would operate to recover information relative to a specific received frequency. The receivers of the multi-frequency synthetic pulse radar system 82 receive signals from a single amplifier 26 fed by the single antenna 24. There is no necessity to provide a separate amplifier and a separate antenna for each receiver.

FIG. 4 discloses a multiple frequency synthetic pulse radar system indicated generally at 90 which will reduce the time required to achieve multi-octave frequency sweeps by simultaneously generating harmonically related sweeps. In the system of FIG. 4, the controller 6 is identical to that shown in FIG. 1, but the transmitter 2 and receiver 4 are replaced by a transmitter 92 and a plurality of receivers 94-94n. The transmitter 92 includes a synthesizer 96 connected to provide an output to a harmonic generator 98, while the input circuit for the receivers 94-94n includes a synthesizer 100 connected to provide an output to a harmonic generator 102. The synthesizers 96 and 100 operate in the same manner as the synthesizers 8 and 28 in FIG. 1, and both generate a spectrum of frequencies in response to a predetermined base periodic signal from the master oscillator 68 and the digital signals from the microprocessor 58. Both of the synthesizers 96 and 100 are tuned to the beginning of one of the desired frequency octaves, and as the synthesizer is tuned throughout the octave, the harmonic generators 98 and 102 are simultaneously producing the appropriate harmonics so as to determine the phase and amplitude of all harmonically related signals as desired. In the transmitter, the output from the harmonic generator 98 is amplified in the amplifier 20, transmitted by the transmit antenna 22, received by the receiver antenna 24 and amplified in the RF amplifier 26. The simultaneously transmitted frequencies are then directed to the receivers 94-94n. There is a single receiver section for each frequency to be received, and a receiver input filter 104 is tuned to pass the specific frequency for each receiver section. The signal passed by the receiver filter 104 is then directed to the power divider 48 and the first and second mixers 50 and 54. These components are identical to those shown in FIG. 1 and operate in the same manner.

The output from the harmonic generator 102 is directed to a quadrature circuit 106 for each receiver which provides an in phase signal and a quadrature signal to the first and second mixers in the same manner as the receiver quadrature circuits of FIGS. 1 and 2. The quadrature circuit 106 may constitute a quadrature hybrid similar to the quadrature circuit 80 in FIG. 2, as this circuit will need to receive, at most, one octave.

Figure 7:
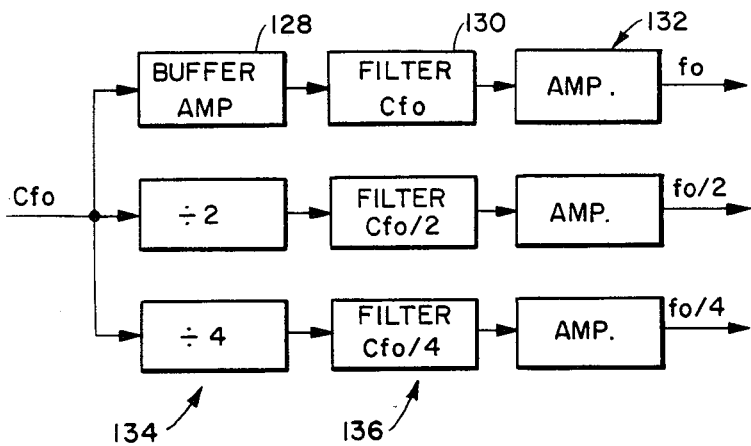
FIG. 7 is a block diagram of a third embodiment of a harmonic generation system for use with the synthetic pulse radar system of FIG. 4.
Figure 5:
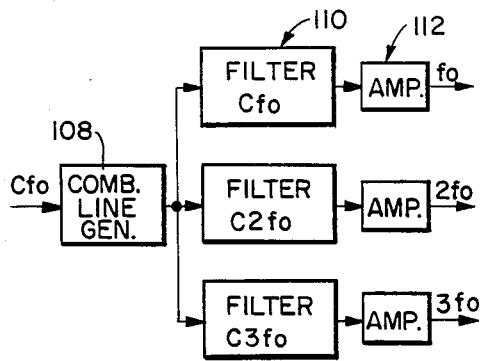
FIG. 5 is a block diagram of a harmonic generation system for use with the synthetic pulse radar system of FIG. 4.
Figure 6:
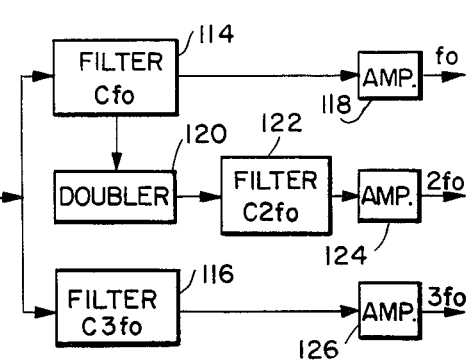
FIG. 6 is a block diagram of a second embodiment of a harmonic generation system for use with the synthetic pulse radar system of FIG. 4.

Three different harmonic generator structures suitable for use as the harmonic generators 98 and 102 are shown by FIGS. 5, 6 and 7. These structures have the ability to generate phase coherent harmonics with independent amplitude characteristics. This is particularly desirable, since attenuation in general is expected to increase significantly with frequency during normal operating conditions.

Referring now to FIG. 5, a simple harmonic generator is illustrated which includes a comb line generator 108 that is excited by either a square wave or sinusoidally from either the synthesizer 96 or the synthesizer 100 at an appropriate synthesizer frequency. If the input frequency Cfo from the synthesizer is, for example, 20 MHz, the output from the comb line generator is directed to a plurality of filters 110. Although only three filters are shown in FIG. 5, the actual number of filters will correspond to the number of frequencies simultaneously transmitted by the transmitter 92. If the synthesizer frequency Cfo is, for example 20 MHz, the filters 110 would be set to pass 20 MHz, 40 MHz, 60 MHz, etc. The output from the filters 110 is then amplified in amplifiers 112, and an individual output is fed to each of the individual receivers 94.

The harmonic generator of FIG. 6 employs a possible technique for taking advantage of the conventional synthesizer output wave form. In this implementation, the synthesizer output Cfo is fed directly to a filter 114 and a filter 116. The filter 114 provides an output sine wave at the frequency fo for amplification by an amplifier 118, and this same output sine wave is applied to the frequency doubler 120 which will generate the frequency 2 fo. The output from the frequency doubler is then filtered in a filter 122 and amplified in amplifier 124.

The filter 116 directly provides the frequency 3 fo for amplification by an amplifier 126.

The harmonic generator of FIG. 7 generates the desired harmonics of the synthesizer output signal Cfo by starting with the highest desired frequency from the synthesizer. This highest synthesizer frequency is passed through a buffer amplifier 128, a filter 130, and is amplified in one of a group of amplifiers 132. The other desired octaves are created by passin9 the synthesizer output signal to a divider chain 134, each divider of which outputs to a suitable filter in a filter group 136. The output of each individual filter in the filter group then is amplified by the amplifiers 132. The divider chain will generate signals fo/2, fo/4 etc. for the number of frequencies required. This technique will generate signals at submultiples of the prime synthesizer frequency with good signal to noise ratio and a flat amplitude response.

Figure 8:
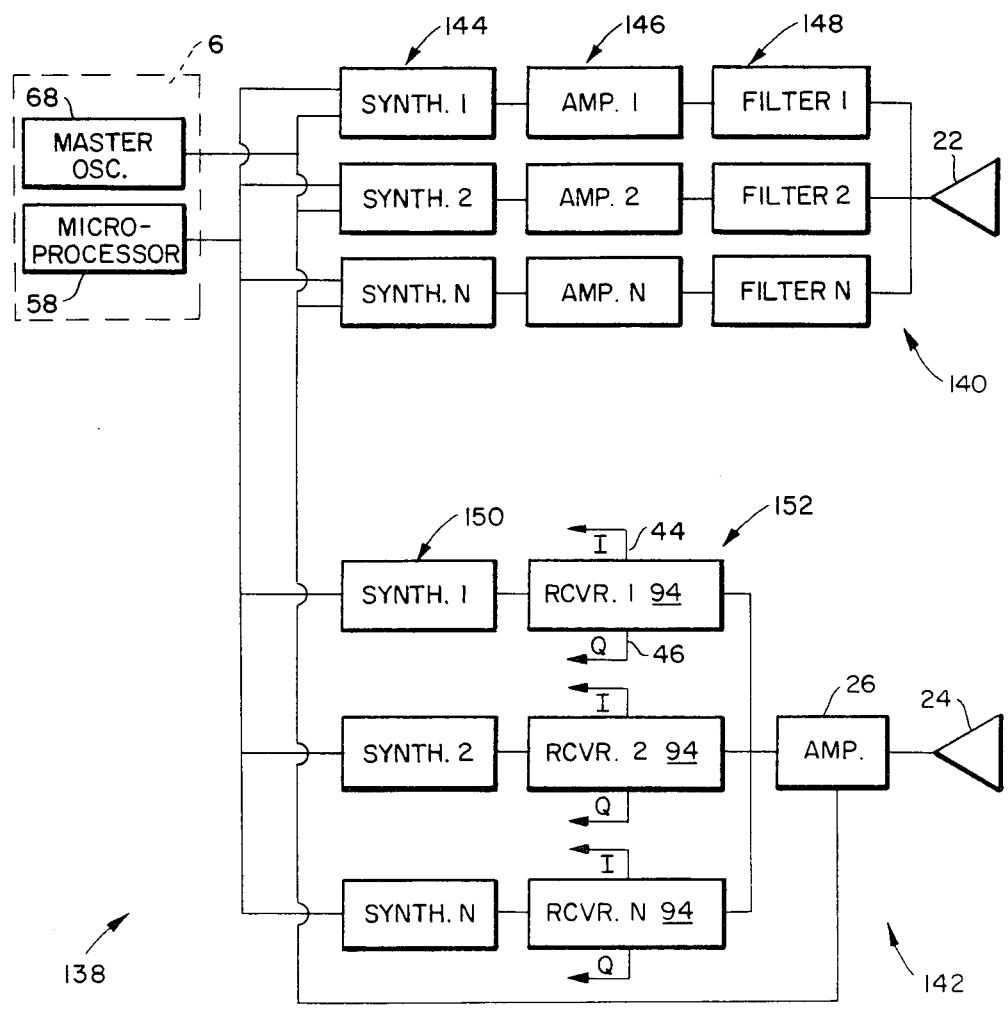
FIG. 8 is a block diagram of a fourth embodiment of the synthetic pulse radar system of the present invention which employs multiple transmitter and receiver frequency synthesizers in a simultaneous multifrequency transmission system.

FIG. 8 discloses another multiple frequency synthetic pulse radar system indicated generally at 138 having a transmitter section 140, a receiver section 142 and the controller 6 of FIG. 1. The transmitter includes a plurality of frequency synthesizers indicated at 144 which are equal in number to the number of frequencies to be simultaneously transmitted by the antenna 22. Each of these independent frequency synthesizers is tuned to a different frequency, but each operates in the same manner as the synthesizer 8 of FIG. 1 to provide a spectrum of frequencies upon receipt thereby of periodic signals from the master oscillator 68 and digital signals from the microprocessor 58. These base periodic signals from each of the synthesizers in the transmitter synthesizer section 144 are amplified by separate amplifiers in an amplifier section 146, and each separate amplifier output is fed through an individual filter tuned to pass the specific amplified base periodic signal to the antenna 22. The tuned filters are included in a filter section 148.

The receiver 142 includes a plurality of individual synthesizers incorporated in a synthesizer section 150, the number of such synthesizers corresponding to the number of individual frequencies simultaneously transmitted by the antenna 22. These receiver synthesizers 150 each operate in the manner of the synthesizer 28 in the receiver of FIG. 1, and like the transmitter synthesizers 144, each receiver synthesizer is tuned to one of the transmitted frequencies. Each individual receiver synthesizer provides an output to the hybrid quadrature circuit (106) of a receiver 94 in a receiver section 152. Each receiver 94 of the receiver section is identical in construction and operation to the receiver 94 shown in detail in FIG. 4. The received signals from the antenna 24 are amplified by the amplifier 26 and provided to the filter (104) in each of the receivers 94. As in the case of the receiver synthesizers, the filters (104) for each receiver are tuned to pass a specific band of frequencies to which the corresponding receiver synthesizer for that receiver is tuned. By the judicious selection of the simultaneously transmitted frequencies, considerable reduction in the undesirable effects of harmonic and intermodulation distortion can be realized.

INDUSTRIAL APPLICABILITY

The disclosed synthetic short pulse radar systems have a high resolution and good penetration which makes them well suited to map most ore deposits, and in fact, such systems are capable of mapping any electrical discontinuity that is more than a few feet in extent. Other uses include the mapping of ice thickness in polar regions, mapping subsurface stratigraphy from within tunnels and mines, and the measurement of coal thickness for controlling automated mining machines. The ability of the system to transmit multiple frequencies simultaneously permits the unit to be employed on moving vehicles or other moving objects. It is possible to transmit the complete Fourier frequency spectrum for each transmitted frequency signal, or in the alternative, to transmit only a portion of the Fourier spectrum.

We claim:

1. A synthetic pulse radar for detecting geophysical phenomena comprising:
    (a) A transmitter means for approximating at least a portion of a Fourier transform of a radar short pulse suitable for transmission toward and modulation by a geophysical target by generaing a plurality of periodic component signals each of which has a uniquely discrete frequency,
    (b) controller means for providing a base periodic signal of a single frequency, and
    (c) receiver means for recovering representative parameters of each said periodic component signal which has been modulated by the geophysical phenomena being measured, said receiver means including an offset frequency synthesizer means for generating a reference signal having a frequency corresponding to the original frequency of the corresponding periodic component signal transmitted by said transmitter means, said offset frequency synthesizer means being connected to receive said base periodic signal and operating to multiply the base periodic signal by each one of a series of integers, said controller means operating to provide a digital signal representative of each said integer by which the base periodic signal is to be multiplied to said offset frequency synthesizer means, means for recovering each said modulated periodic component signal, receiver mixing means for mixing each said recovered modulated periodic component signal with said reference signal to produce a parameter signal, a quadrature circuit means for producing an in-phase reference signal of a single frequency and a quadrature reference signal of said single frequency having a 90° phase shift relative to the in-phase reference signal, a first mixer circuit means for mixing said in-phase reference signal with the parameter signal from said receiver mixing means to produce an in-phase component of said parameter signal, and second mixer circuit means for mixing said quadrature reference signal with the parameter signal from said receiver mixing means to produce a quadrature component of said parameter signal.

2. A synthetic pulse radar as defined in claim 1 wherein said quadrature circuit means receives said base periodic signal from said controller means.

3. A synthetic pulse radar as defined by claim 2 wherein said transmitter means is connected to receive said base periodic signal, said transmitter means including component signal generation means for generating said periodic component signals by producing multiples of said base periodic signal.

4. A synthetic pulse radar as defined in claim 3, wherein said periodic component signal generation means includes synthesizer means for multiplying said base periodic signal times each one of a series of integers, said synthesizer means including input means for receiving a digital signal representative of each said integer by which the base periodic signal is to be multiplied.

5. A synthetic pulse radar as defined in claim 4, wherein said controller means provides the base periodic signal of a single frequency to said component signal generation means and to said offset frequency synthesizer means and a digital signal representative of each said integer to said input control means and to said offset frequency synthesizer means.

6. A synthetic pulse radar as defined in claim 3 wherein said controller means provides the base periodic signal of a single frequency to said component signal generating means and to said offset frequency synthesizer means and a digital signal representative of each said integer to said input control means and to said offset frequency synthesizer means.

7. A synthetic pulse radar for detecting geophysical phenomena comprising:
 (a) a transmitter means for approximating at least a portion of a Fourier transform of a radar short pulse suitable for transmission toward and modulation by a geophysical target by generating a plurality of component signals, each of which has a uniquely discrete frequency;
  (1) said transmitter means including component signal generation means for generating said plurality of component signals,
  (2) harmonic generating means for receiving said component signals and producing multioctive harmonic component signals harmonically related to said component signals,
  (3) and signal transmission means for receiving said plurality of harmonic component signals and operative to braodcast said harmonic componet signals substantially simultaneously toward said geophysical phenomena;
 (b) receiver means for determining representative parameters of each said harmonic component signal by receiving said plurality of harmonic component signals, each of which has been modulated by the geophysical phenomena being measured to permit derivation of information about the geophysical phenomena, said receiver means including mixing means for separately producing a parameter signal representing each said recovered parameter for each broadcast harmonic component signal by mixing a recovered signal representative of each received harmonic component signal modulated by said geophysical phenomena with a reference signal having a frequency substantially equal to the original frequency of the respective harmonic component signal as broadcast by said transmitter means; and
 (c) reference signal generating means for providing said reference signal to said receiver means, said reference signal generating means operating to generate a reference signal containing multioctive harmonic base reference signals which correspond to the frequnces of said multioctive harmonic component signals.

8. A synthetic pulse radar as defined in claim 7, wherein said harmonic generating means includes comb line generator means for producing a frequency spectrum of signals upon excitation by a base periodic signal and filter means connected to receive said frequency spectrum of signals from said comb line generator means, said filter means operating to simultaneously pass a plurality of said signals within a predetermined frequency range.

9. A synthetic pulse radar as defined in claim 7, wherein said receiver means includes a plurality of receiver sections at least equal in number to the number of harmonic component signals transmitted simultaneously by said transmitter means.

10. A synthetic pulse radar system as defined in claim 9, wherein each such receiver section includes an input filter tuned to pass a band of frequencies including at least one of said received harmonic component signals, quadrature circuit means adapted to receive from said reference signal generating means a base reference signal having a frequency which is substantially equal to the transmission frequency of the harmonic component signal to be passed by said input filter, said quadrature circuit means producing an in-phase reference signal having the same frequency as said reference signal and a quadrature reference signal having the same frequency and a 90° phase sahift relative to said in-phase reference signal, a first mixer means connected to receive and mix said harmonic component signal from said input filter and said in-phase reference signal, and a second mixer means connected to receive and mix said harmonic component signal from said input filter and said quadrature reference signal.

11. A synthetic pulse radar as defined by claim 7 which includes controller means for providing a base periodic signal of a single frequency and digital signals, each digital signal representing an integer in a series of integers, said component signal generating means including frequency synthesizer means connected to receive said base periodic signal and said digital signal, said frequency synthesizer means operating to multiply said base periodic signal times the integers in said series of integers to provide said periodic component signal.

12. A synthetic pulse radar as defined by claim 11 wherein said reference signal generating means includes reference frequency synthesizer means connected to receive aid base periodic signal and said digital signal, said reference frequency synthesizer means operating to multiply said base periodic signal times the integers in said series of integers to provide an output signal corresponding in frequency to said periodic component signal, and reference harmonic generating means for receiving the output signal from said reference frequency synthesizer means and operating to produce said reference signal.

13. A synthetic pulse radar for detecting geophysical phenomena comprising:
   (a) controller means for providing a base periodic signal of a single frequency and digital signals, each of which represents an integer in a series of integers,
   (b) transmitter means for approximating at least a portion of a Fourier transform of a radar short pulse suitable for transmission toward and modulation by a geophysical target by generating a plurality of multioctive harmonic component signals,
      (1) said transmitter means including harmonic component signal generating means for receiving said base periodic signal and said digital signals and for generating a first plurality of component signals, each of which has a discrete frequency, and a plurality of harmonic component signals which are harmonically related to said first plurality of component signals and to provide said first plurality of component signals and said harmonic component signals as said plurality of multioctive harmonic component signals,
      (2) and signal transmission means for receiving said plurality of multioctive harmonic component signals from said harmonic component signal generating means and operative to simultaneously broadcast said plurality of multioctive harmonic component signals toward a geophysical phenomena;
   (c) reference signal generating means connected to receive said base periodic signal and said digital signals from said controller means, said reference signal generating means operating to generate a plurality of multioctive harmonic component reference signals which correspond in frequency to said plurality of multioctive harmonic component signals, and
   (d) receiver means for receivihg and determining representative parameters of each of said plurality of multioctive harmonic component signals, each of which has been modulated by the geophysical phenomena being measured, said receiver means including a plurality of receiver sections at least equal in number to the number of multioctive harmonic component signals transmitted simultaneously by said signal transmission means, each such receiver section including mixing means for receiving a signal portion of said received multioctive harmonic component signal and a reference portion of said multioctive harmonic reference signal which corresponds in frequency to the transmission frequency of said portion of the received multioctive harmonic component signal, said mixing means operating to mix said signal and reference portions to produce a parameter signal.

14. A synthetic pulse radar as defined by claim 13 wherein the harmonic component signal generating means for said transmitter means includes a plurality of transmitter frequency synthesizer sections at least equal in number to the number of multioctive harmonic component signals to be transmitted simultaneously by said signal transmission means, each such trnasmitter synthesizer section including a transmitter frequency synthesizer means operative to produce a specific frequency portion of said multioctive harmonic component signals.

15. A synthetic pulse radar as defined by claim 14 wherein each transmitter synthesizer section includes output filter means tuned to pass signals of specific frequencies from the transmitter frequency synthesizer means for said transmitter synthesizer section, each said transmitter frequency synthesizer means operating to receive said base periodic signal and digital signals from said controller means and to provide an output signal by producing multiples of said base periodic and digital signals.

16. A synthetic pulse radar as defined by claim 13 wherein said reference signal generating means includes a plurality of reference frequency synthesizer means at least equal in number to the number of multioctive harmonic component signals to be transmitted simultaneously by said signal transmission means, each said reference frequency synthesizer means operating to receive said base periodic and digital signals from said controller means and to produce therefrom a specific frequency portion of said multioctive harmonic component reference signals.

17. A synthetic pulse radar as defined by claim 13 wherein each such receiver section includes an input filter tuned to pass a band of frequencies defining a signal portion of said received multioctive harmonic component signal, quadrature circuit means connected to receive from said reference signal generating means a reference portion of said multioctive harmonic reference signal which corresponds in frequency to the transmission frequency of said portion of the received multioctive harmonic component signal passed by said input filter, said quadrature circuit means operating to produce an in-phase reference signal having the same frequency as said reference portion and a quadrature reference signal having the same frequency and a 90° phase shift relative to said in-phase reference signal, a first mixer means connected to receive and mix the signal portion passed by said input filter and said in-phase reference signal, and a second mixer means connected to receive and mix the signal portion passed by said input filter and said quadrature reference signal.

18. A synthetic pulse radar as defined by claim 17 wherein said reference signal generating means includes reference frequency synthesizer means connected to receive said base periodic signal and said digital signal, said reference frequency synthesizer means operating to multiply said base periodic signal times the integers represented by said digital signals to provide an output signal corresponding in frequency to the first plurality of component signals generated by the harmonic component signal generating means of said transmitter means, and reference harmonic generating means for receiving the output signal from said reference frequency synthesizer means and operating to generate therefrom said plurality of multiocative harmonic component reference signals.

* * * * *